United States Patent

[11] 3,618,892

| [72] | Inventor | Joseph S. Sciuto, Jr. |
| | | Crestwood, Mo. |
| [21] | Appl. No. | 783,315 |
| [22] | Filed | Dec. 12, 1968 |
| [45] | Patented | Nov. 9, 1971 |
| [73] | Assignee | Stile-Craft Manufacturers, Inc. |
| | | St. Louis, Mo. |

[54] SLEEVE-OPERATED VALVED COUPLING
11 Claims, 5 Drawing Figs.

[52] U.S. Cl. ................................................. 251/149.2,
251/149.9
[51] Int. Cl. ...................................................... F16l 37/28
[50] Field of Search ........................................... 251/149,
149.2, 149.8, 149.9, 149.5; 137/614.06, 614.02,
614.03, 614.05

[56] References Cited
UNITED STATES PATENTS

| 3,140,072 | 7/1964 | Sciuto, Jr. ................ | 251/149.9 X |
| 3,423,063 | 1/1969 | German .................... | 251/149.9 X |
| 2,948,553 | 8/1960 | Gill et al. ................. | 137/614.02 |
| 3,078,068 | 2/1963 | Romney .................... | 251/149.2 |

*Primary Examiner*—William R. Cline
*Attorney*—Cohn and Powell

ABSTRACT: A coupling having a ball valve member rotatively supported in a valve chamber of a tubular body, the ball valve member being provided with a substantially straight passage that communicates a chamber inlet and outlet when the ball valve member is located in the valve-open position. A plug is received in a body socket and communicates with the chamber outlet. When the ball valve member is disposed in the valve-open position, a substantially straight through flow passageway is provided in the coupling. A sleeve, slidably mounted on the body, and the ball valve member are interconnected by a means that selectively moves the ball valve member to the valve-open or valve-closed position upon slidable longitudinal actuation of the sleeve. The interconnecting means includes a transverse groove in the ball valve member which receives a pin carried by and movable with the sleeve, the pin engaging opposed groove shoulders to turn the ball valve member as the sleeve is longitudinally manipulated. The same pin operates in a body opening of predetermined configuration to control longitudinal sleeve movement and to lock the sleeve selectively in at least one limit when the ball valve member is in its valve-closed position, the sleeve being angularly related on the body, when so locked, to permit insertion or withdrawal of the plug relative to the body socket. The sleeve is rotatable out of locked position to latch the plug and is then capable of longitudinal sliding movement to actuate the ball valve member.

Inventor
JOSEPH S. SCIUTO, JR.
By Cohn and Powell
Attorneys

SLEEVE-OPERATED VALVED COUPLING

BACKGROUND OF THE INVENTION

This invention relates generally to improvements in a coupling, and more particularly to improvements in a hose coupling that can be quickly and easily connected or disconnected. The present coupling is an improvement of the coupling disclosed in U.S. Pat. Nos. 3,106,378 and 3,106,379, owned by the common assignee.

In one type of heretofore quick-connect disconnect coupling, the plug directly actuated a valve mechanism when inserted into the socket of a coupling body to cause fluid flow under pressure. The valve mechanism was usually open before the plug was latched into position. As a result, considerable effort was required, depending on the magnitude of the pressure involved in the system, to force the plug inwardly against such pressure until the plug was latched. In addition, a latching sleeve cooperated with radially moving locking elements upon reciprocating sleeve movement to release the plug while the plug was subjected to fluid pressure. This pressure tended to eject the plug forcibly from the body socket, thereby creating a potentially hazardous condition.

In most types of heretofore conventional couplings, the flow path was torturous, creating many obstacles to the fluid in moving through the coupling. For example, in the couplings mentioned, the fluid had to flow around a valve stem and its associated spring and supporting structure. In still other couplings, the flow was turned and redirected in various directions through valve ports before reaching the plug. These obstacles and twisting flow path caused an increase in pressure drop and in friction.

SUMMARY OF THE INVENTION

The present coupling provides a coacting body and plug that are latched together before the valve mechanism can be opened. Conversely, the valve mechanism is closed before the body and plug can be unlatched. It requires no effort to connect the plug to the body because the plug is not subjected to the flow under pressure during such action, and importantly, the hazardous situation of possible ejection of the plug under pressure is avoided.

The coupling has a straight through air passage. There are no obstacles to fluid flow and no circuitous flow path. Consequently, there is less friction created and the lowest possible pressure drop is afforded.

A valve member is supported in a valve chamber of the body for oscillative movement to a valve-open position or a valve-closed position. When in the valve-open position, a straight passage in the valve member aligns with and places the chamber inlet in communication with the chamber outlet and open plug end. Means interconnecting the valve member with a sleeve, slidably mounted on the body, operates to turn the valve member selectively to either position upon slidable sleeve actuation.

The means interconnecting the sleeve and valve member includes a pin carried by and movable with the sleeve, the pin extending into the valve chamber and into a transverse groove in the valve member. As the sleeve is reciprocatively and slidably moved between longitudinal limits, the pin engages the groove shoulders to turn the valve member to the valve-open or valve-closed position. In order to utilize the maximum stroke of the pin in turning the valve member, the transverse groove is located adjacent one end of the valve member passage.

The body is provided with a lateral opening through which the pin extends, the body opening being at least partially defined by an elongate longitudinal body margin that engages and guides the pin during reciprocative longitudinal movement of the sleeve. At one limit of sleeve movement, the body opening has a transverse body opening portion into which the pin is moved upon angularly twisting or rotating the sleeve. When so located, the sleeve is locked against unintentional longitudinal movement with the valve member in the valve- closed position and with the latch means conditioned to permit insertion or withdrawal of the plug from the body socket.

DESCRIPTION OF THE PREFERRED EMBODIMENT

Figure 3:
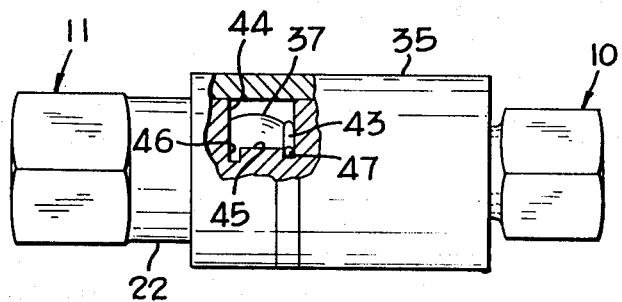
FIG. 3 is a side elevational view of the coupling, partly in cross section and cut away to illustrate the body opening in which the sleeve pin is moved.

The quick-connect disconnect coupling includes a male member generally indicated by 10 and a cooperating female member referred to by 11.

The male member 10 includes a threaded fitting 12 adapted to be connected threadedly to a hose or other line to a fluid system. A nut 13 formed integrally with fitting 12 facilitates attachment of the male member 10 to the associated hose. Extending forwardly from and formed integrally with nut 13 is a plug 14. The male member 10 is tubular as provided by a longitudinal passageway 15 in extending plug 14, nut 13 and the internally threaded fitting 12. The plug 14 has an open end 16.

An annular groove 17 is provided about the periphery of plug 14. The forwardmost margin defining the groove 17 is inclined forwardly to provide a cam shoulder 18. The plug 14 is provided with a reduced end portion 20 and a rearwardly inclined cam shoulder 21.

The female member 11 includes a tubular body 22, the rearmost end of which is threadedly attached to a fitting 23 that includes an integral nut 24. The interior of fitting 23 is threaded and adapted to be connected to its associated hose.

Formed in the forward end of body 22 is a stepped socket 25 that conforms to and is adapted to receive the stepped plug 14. An O-ring 26 is carried by the body 22 and is located internally at the reduced inwardmost end of socket 25 so as to sealingly engage the reduced plug end portion 20 upon insertion of plug 14 into socket 25. Extending across the inner end of socket 24 is a partition 27 formed integrally with the body 22.

Located at the other side of body partition 27 is a valve chamber 30 having an inlet 31 aligned with the tubular fitting 23, and having an outlet 32 in the partition 27. The chamber inlet 31, chamber outlet 32 and the plug end 16 are axially aligned.

Figure 5:
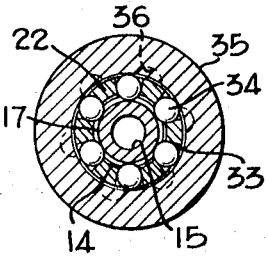
FIG. 5 is a cross-sectional view taken on line 5—5 of FIG. 2.

The latch mechanism includes a plurality of spaced apertures 33 formed peripherally about the body 22 and communicating with the socket 25. In the preferred embodiment, a total of six apertures 33 are provided which are located in 60° relationship as is best seen in FIG. 5. It will be noted that the apertures 33 are tapered inwardly toward the socket 25 for reasons which will later appear.

Located in each of the apertures 33 is a ball 34 constituting a locking element. The locking balls 34 are adapted to move radially into and out of the socket 25. However, it will be noted that the tapered apertures 33 engage the balls 34 to prevent the balls from falling freely into the socket 25.

The mechanism for effectively and operatively actuating the latch and valve in this coupling includes a sleeve 35 slidably mounted on body 22. The front end of sleeve 35 is provided with a plurality of shallow recesses 36 spaced peripherally about the internal bore of such sleeve, the number of recesses 36 corresponding to the number of locking balls 34.

Figure 1:
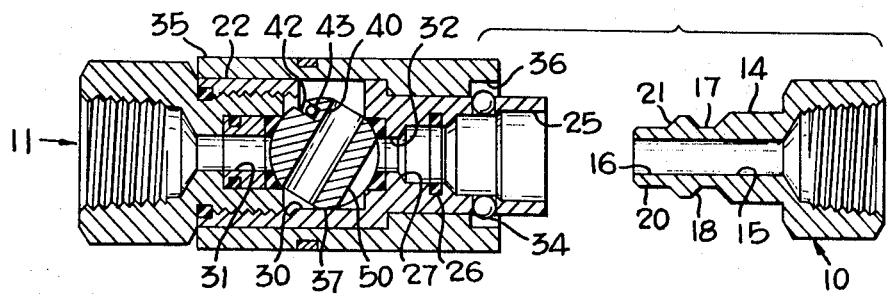
FIG. 1 is a cross-sectional view along a vertical plane passed through the longitudinal axis, the actuating sleeve being moved to its valve-closed position and plug-unlatched position, and illustrating the plug detached.
Figure 4:
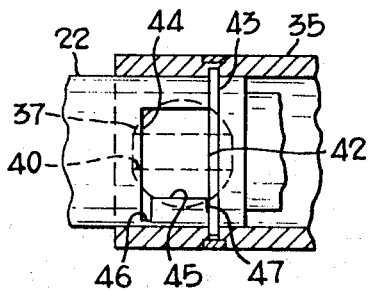
FIG. 4 is a fragmentary cross-sectional view from the top of FIG. 3 showing the body opening with the sleeve cut away.

In one rotative position of sleeve 35 in its fully retracted limit illustrated in FIG. 1, the recesses 36 are aligned with the balls 34 and are adapted to receive the balls 34 to permit the locking balls 34 to move outwardly of the body 22 and thereby disengage operatively from the plug 14.

Figure 2:
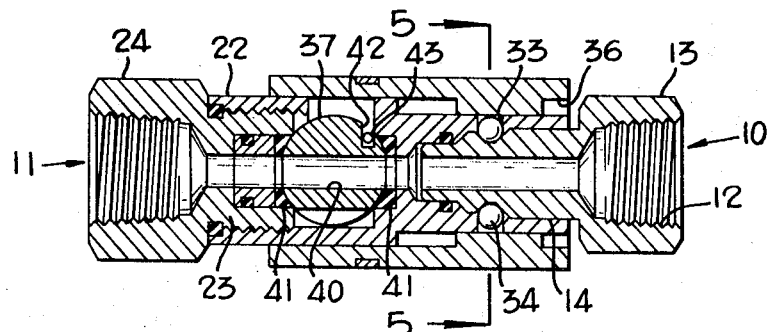
FIG. 2 is a cross-sectional view similar to FIG. 1, but illustrating the plug attached and the actuating sleeve in its valve-open and plug-latched position.

The valve mechanism includes a ball valve member 37 oscillatively mounted in the valve chamber 30. Formed axially through the ball valve member 37 is a passage 40 that is alignable with the chamber inlet 31 and chamber outlet 32 in one adjusted valve-open position of the ball valve member 37 as is best illustrated in FIG. 2. Sealing means 41 are located about the chamber inlet 31 and the chamber outlet 32 at opposite sides of the ball valve member 37, the sealing means 41 engaging the ball valve member 37 and being located about the passage 40 when the ball valve member 37 is located in the valve-open position illustrated in FIG. 2.

Formed in ball valve member 37 is a transverse groove 42, located preferably at right angles to the longitudinal axis of valve passage 40. The transverse groove 42 is located closely adjacent one end of the valve passage 40. Received in the transverse groove 42 is a pin 43 that is carried by and movable with the sleeve 35, the pin 43 extending across the valve chamber 30. Movement of the sleeve 35 reciprocatively and longitudinally of the body 22 will cause the pin 43 to engage the opposed shoulders defining the transverse groove 42, and thereby selectively move or rotate the ball valve member 37 to either the valve-open position shown in FIG. 2 or the valve-closed position shown in FIG. 1. During this oscillative movement of the ball valve member 37, the pin 43 will move depthwise in the transverse groove 42 and will slidably engage the opposed shoulders defining such groove 42.

The guide and safety lock means includes a lateral body opening 44 that is partially defined by a longitudinal body opening margin 45 along which the pin 43 engages and travels during reciprocative movement of the sleeve 35. The body opening 44 includes a transverse opening portion 46 at one end into which the pin 43 is movable upon twisting of the sleeve 35 on body 22 after the sleeve 35 is rotated in the valve-closed position. As will later appear, when the pin 43 is located in the transverse body opening portion 46, the sleeve 35 is locked against unintentional longitudinal movement and the locking balls 34 are aligned with the sleeve recesses 36 to permit insertion or withdrawal of plug 14 from the body socket 25.

Another transverse body opening portion 47 is located at the other end of body opening 44 which is adapted to receive the pin 43 upon twisting of the sleeve 35 when the sleeve 35 is located in the valve-open position. When located in this position, the sleeve 35 is locked to preclude unintentional longitudinal movement such as would tend to close the valve.

It is thought that the operation and functional advantages of the coupling have become fully apparent from the foregoing detailed description of parts, but for completeness of disclosure, the connection and disconnection of the coupling members will be briefly described.

It will be assumed that the coupling members 10 and 11 are detached, and that the sleeve 35 is in the fully retracted limit illustrated in FIG. 1 and is rotated in this limit until the pin 43 is located in transverse body opening portion 46. In this position, the sleeve 35 is locked against reciprocation. Moreover, in this position of sleeve 35, the front recesses 36 are aligned directly opposite the locking balls 34 so that the balls can be moved outwardly into a plug-unlatched position, and the transverse pin 43 has turned the ball valve member 37 to its valve-closed position.

First, the plug 14 is inserted into body socket 25. As the plug 14 moves inwardly, the camming shoulder 21 engages the locking balls 34 to move the balls 34 outwardly into the front recesses 36 of sleeve 35. Because the sleeve 35 overlies the balls 34, the balls 34 are retained in the body apertures 33. Next, the O-ring 26 engages the reduced plug end 20 to provide a seal. When fully inserted, the groove 17 is aligned radially with the locking balls 34.

It will be importantly noted that during this insertion of plug 14, the valve mechanism remains closed, and consequently the plug 14 is not subjected to any fluid pressure.

After the plug 14 is fully inserted, the actuating sleeve 35 is rotated while in its fully retracted limit. Guiding the sleeve 35 upon such rotative movement, the pin 43 moves along the transverse opening portion 46 into the rear end of body opening 44. As the sleeve 35 is rotated to the position defined above, the sleeve recesses 36 move out of alignment with the locking balls 34 and the locking balls 34 are moved inwardly into the socket 25 and into latching engagement with the plug 14. It will now be noted that the plug 14 is latched, yet the valve mechanism is still closed.

Then, the actuating sleeve 35 is moved forwardly to the other extended limit shown in FIG. 2. During this forward movement of sleeve 35, the pin 43 moves from the rear end to the front end of body opening 44, being guided by engagement with the longitudinal opening margin 45. As the sleeve 35 moves forwardly, the pin 43 engages and slides on the forward shoulder defining the transverse groove 42 and rotates the ball valve member 37 from the valve-closed position shown in FIG. 1 to the valve-open position shown in FIG. 2. There is now provided a straight through flow path through the coupling.

In this extended limit of sleeve 35, the recesses 36 are still misaligned relative to the locking balls 34 so that the plug 14 remains latched.

The sleeve 35 is then rotated as permitted by the movement of pin 43 into the front transverse opening portion 47. Again, the sleeve 35 is locked into position against reciprocation, the valve mechanism remains open and the plug 14 remains latched.

It will be importantly noted that the sleeve 35 is locked against reciprocation in each of its limits upon rotation of the pin 43 into the respective transverse body opening portions 46 and 47. Also it will be realized that the valve mechanism is only closed by the sleeve 35 when the sleeve is moved longitudinally to its retracted limit and that the plug 14 can only be unlatched when the sleeve is rotated to a locked position while in this retracted limit.

Disconnection of the coupling members 10 and 11 is accomplished by the mere reversal of the above-described procedure. For example, the sleeve 35 is rotated to move the pin 43 along the transverse body opening portion 47 into the front end of body opening 44, whereby to unlock the sleeve 35. Then, the sleeve 35 is moved rearwardly from its fully extended limit toward the rear end of the body opening 44, the pin 43 slidably engaging the opening margin 45. During this longitudinal movement of sleeve 35, the pin 43 engages the rear shoulder defining the transverse groove 42 and rotates the ball valve member 37 from the valve-open position shown in FIG. 2 to the valve-closed position shown in FIG. 1. The locking balls 34 are maintained in their latched position by engagement with the overlying sleeve 35.

After the valve mechanism is completely closed and the sleeve 35 is located in its fully retracted limit, the sleeve 35 is then rotated to move the pin 43 into the rear transverse body opening portion 46. When the sleeve 35 is rotated as described, the sleeve 35 is locked against reciprocation, and in addition, the sleeve recesses 36 are aligned with the locking balls 34 to permit withdrawal of the plug 14. As the plug 14 is moved outwardly, the cam shoulder 18 forces the locking balls 34 radially outward of the apertures 33 into the sleeve recesses 36. The locking balls 34 then ride over the periphery of the plug 14 as the plug is fully withdrawn.

Under some circumstances, there can be fluid pressure existing momentarily in male member 10 when the sleeve 35 is retracted to move the ball valve member 37 to its valve-closed position. As stated previously, in this limit of sleeve 35, the plug 14 remains effectively latched by the locking balls 34. Any fluid pressure existing within the male member 10 is released by the escape of fluid from plug 14 through a pressure-release groove 50, communicating the chamber outlet 32 with the valve chamber 30, and thence to the atmosphere by way of the clearance space between the sleeve 35 and the body 22.

I claim as my invention:

1. In a coupling:
   a. a tubular plug having an open end,
   b. a body provided with a socket receiving the plug, the body being provided with a valve chamber, the valve chamber having an inlet and an outlet,
   c. a valve member supported in the valve chamber for oscillative movement to a valve-open position or a valve-closed position, the valve member being provided with a substantially straight passage therethrough, the passage, the chamber inlet, chamber outlet and plug end being substantially aligned in a substantially straight flow path when the valve member is in the valve-open position,
   d. valve-seating means at opposite sides of and engaging the valve member, the valve-seating means being located about the passage when the valve member is in the valve-open position,
   e. a sleeve slidably mounted on the body,
   f. means interconnecting the sleeve and valve member for moving the valve member selectively to the valve-open position or the valve-closed position on slidable actuation of the sleeve,
   g. the means interconnecting the sleeve and valve member including:
      1. a groove in the valve member, and
      2. a pin carried by and movable with the sleeve, the pin being received in the groove and engaging the valve member to move the valve member to the valve-open position or valve-closed position upon sleeve actuation.

2. A coupling as defined in claim 1, in which:
   h. the groove extends transversely of the valve member passage, the groove having opposed transverse shoulders, and
   i. the pin moves in a direction depthwise of the groove, while slidably engaging the groove shoulders, upon turning the valve member to the valve-open or valve-closed position.

3. A coupling as defined in claim 2, in which:
   j. the groove is in the exterior surface of the valve member and opens outwardly.

4. A coupling as defined in claim 2, in which:
   j. the groove is located in the valve member adjacent one end of the valve member passage.

5. A coupling as defined in claim 2, in which:
   j. the body includes a lateral opening, and
   k. the pin is fixed to opposite sides of the sleeve, the pin extending through the body opening and across the valve chamber and the valve member.

6. A coupling as defined in claim 3, in which:
   j. the body includes a lateral opening having a generally longitudinal body opening margin and a transverse body opening portion, and
   k. the pin extends through the body opening, and moves along the longitudinal body opening margin upon longitudinal movement of the sleeve between limits, the pin being selectively movable into the transverse body opening portion upon twisting the sleeve to lock the sleeve against unintentional longitudinal movement when the valve member is in the valve-closed position.

7. A coupling as defined in claim 2, in which:
   j. the body includes a lateral opening having a generally longitudinal body opening margin and having a transverse body opening portion at each end thereof, and
   k. the pin extends through the body opening, and moves along the longitudinal body opening margin upon longitudinal movement of the sleeve between limits, the pin being selectively movable into the transverse opening body portions upon twisting the sleeve when located in the limits to lock the sleeve against unintentional longitudinal movement.

8. In a coupling:
   a. a tubular plug having an open end,
   b. a body provided with a socket receiving the plug, the body being provided with a valve chamber, the valve chamber having an inlet and an outlet,
   c. a valve member supported in the valve chamber for oscillative movement to a valve-open position or a valve-closed position, the valve member being provided with a substantially straight passage therethrough, the passage, the chamber inlet, chamber outlet and plug end being substantially aligned in a substantially straight flow path when the valve member is in the valve-open position,
   d. valve-seating means at opposite sides of and engaging the valve member, the valve-seating means being located about the passage when the valve member is in the valve-open position,
   e. a sleeve slidably mounted on the body,
   f. means interconnecting the sleeve and valve member for moving the valve member selectively to the valve-open position or the valve-closed position on slidable actuation of the sleeve,
   g. the means interconnecting the sleeve and valve member includes a pin carried by and movable with the sleeve, the pin engaging the valve member for turning the valve member to the valve-open or valve-closed position upon longitudinal sliding movement of the sleeve,
   h. the body includes a lateral opening extending generally longitudinally of the body through which the pin extends and moves upon sleeve actuation,
   i. the body opening having a transverse body opening portion receiving the pin upon twisting of the sleeve to lock the sleeve against unintentional movement when the valve member is in the valve-closed position.

9. In a coupling:
   a. a tubular plug having an open end,
   b. a body provided with a socket receiving the plug, the body being provided with a valve chamber, the valve chamber having an inlet and an outlet,
   c. a valve member supported in the valve chamber for oscillative movement to a valve-open position or a valve-closed position, the valve member being provided with a substantially straight passage therethrough, the passage, the chamber inlet, chamber outlet and plug end being substantially aligned in a substantially straight flow path when the valve member is in the valve-open position,
   d. valve-seating means at opposite sides of and engaging the valve member, the valve-seating means being located about the passage when the valve member is in the valve-open position,
   e. a sleeve slidably mounted on the body,
   f. means interconnecting the sleeve and valve member for moving the valve member selectively to the valve-open position or the valve-closed position on slidable actuation of the sleeve,
   g. the means interconnecting the sleeve and valve member including:
      1. an elongate groove extending transversely of the valve passage and having opposed shoulders,
      2. a pin carried by and movable with the sleeve, the pin extending across the valve chamber and into the groove, and
      3. the groove having a depth so that the pin moves in a direction depthwise of the groove while slidably engaging the groove shoulders upon turning the valve member to the valve-open or valve-closed position by selective longitudinal sliding movement of the sleeve between limits, and
   h. guide and lock means interconnecting the sleeve and body, the guide and lock means including:
      1. an opening in the body through which the pin extends, the body opening having at least one elongate longitudinal margin engaging the pin to constrain the sleeve to longitudinal movement between limits when actuating the valve member to the valve-open position, and
      2. the body opening having a transverse opening into which the pin moves at one limit of the sleeve upon twisting of the sleeve so as to lock the sleeve against unintentional longitudinal movement when the valve member is in the valve-closed position.

10. A coupling as defined in claim 9, in which:
i. the valve member is substantially a ball,
j. the transverse groove in the ball valve member is located adjacent one end of the passage, and
k. the valve chamber has a longitudinal dimension to accommodate the extent of longitudinal pin travel in the chamber upon reciprocation of the sleeve incident to positioning of the ball valve member.

11. A coupling as defined in claim 10, in which:
1. locking means is carried by the body and engages the plug, and
m. the sleeve engages the locking means to lock the plug in the socket when the sleeve is twisted to move the pin from the transverse body opening portion and into engagement with the longitudinal body opening margin and while the sleeve is moved longitudinally in a direction to move the ball valve member to the valve-open position.

* * * * *